United States Patent [19]

Kimura et al.

[11] Patent Number: 5,418,933
[45] Date of Patent: May 23, 1995

[54] BIDIRECTIONAL TRI-STATE DATA BUS BUFFER CONTROL CIRCUIT FOR DELAYING DIRECTION SWITCHING AT I/O PINS OF SEMICONDUCTOR INTEGRATED CIRCUIT

[75] Inventors: Kazuo Kimura, Tenri; Takeshi Yoshii; Shigeki Imai, both of Nara; Katsuhiro Masui, Kashihara, all of Japan

[73] Assignee: Sharp Kabushiki Kaisha, Osaka, Japan

[21] Appl. No.: 829,472

[22] Filed: Feb. 3, 1992

[30] Foreign Application Priority Data

Feb. 20, 1990 [JP] Japan .................. 3-026322

[51] Int. Cl.$^6$ .................. G06F 13/00; G06F 13/38
[52] U.S. Cl. .................. 395/550; 364/DIG. 1; 364/232.8; 364/239; 364/238.6
[58] Field of Search ............ 395/250, 325, 800, 275, 395/550; 364/232.8; 307/475, 281; 365/233.5

[56] References Cited

U.S. PATENT DOCUMENTS

| | | | |
|---|---|---|---|
| 4,652,992 | 3/1987 | Mensch | 395/800 |
| 4,813,020 | 3/1989 | Iwamura et al. | 365/189 |
| 4,821,170 | 4/1989 | Bernick et al. | 395/275 |
| 5,065,224 | 11/1991 | Fraser et al. | 357/70 |
| 5,089,951 | 2/1992 | Iijima | 395/275 |
| 5,095,485 | 3/1992 | Sato | 371/51.1 |
| 5,247,689 | 9/1993 | Ewert | 395/500 |

FOREIGN PATENT DOCUMENTS 1-253315 10/1989 Japan .
1-256212 10/1989 Japan .
2-64254 5/1990 Japan .

OTHER PUBLICATIONS

Bursky "Microprocessor Systems Design and Application" 1980 pp. 32–33.
Am 8085A/Am 8085A-2/Am 9085ADM Specification (Veronis "Microprocessor Hardware and Applications", Appendix D pp. 723–733, 1986).
Mano Morris, "Computer System Architecture", 2nd Ed., pp. 266–269, 1983.

*Primary Examiner*—Thomas C. Lee
*Assistant Examiner*—D. Dinh
*Attorney, Agent, or Firm*—Nixon & Vanderhye

[57] ABSTRACT

A data bus control circuit is formed on a single semiconductor integrated circuit that includes input/output terminals for external data exchange and a plurality of functional blocks including a CPU. A bi-directional bus buffer buffers data sent over a data bus between the CPU and the input/output terminals. The signal propagation direction of the bus buffer is determined according to a logic level of a read control signal supplied from the CPU.

3 Claims, 8 Drawing Sheets

BIDIRECTIONAL TRI-STATE DATA BUS BUFFER CONTROL CIRCUIT FOR DELAYING DIRECTION SWITCHING AT I/O PINS OF SEMICONDUCTOR INTEGRATED CIRCUIT

BACKGROUND OF THE INVENTION

1. Field of the Invention

This invention relates to a semiconductor integrated circuit, and more particularly to a semiconductor integrated circuit constructed by forming a plurality of functional blocks including a CPU block on a single semiconductor chip.

2. Description of the Related Art

Conventionally, in a composite IC or LSI having a plurality of functional blocks including a CPU block, a data bus of the CPU is directly connected to input/output terminals of the composite IC or LSI, or it is connected through resistors serving as bus buffers to the input/output terminals. An example of the former is shown in FIG. 8, while an example of the latter is shown in FIG. 9.

In the composite LSI of FIG. 8, a data bus 102 of a CPU 101 is directly connected to input/output terminals 104 of a composite LSI 103. Reference numeral 105 denotes an output terminal for outputting a read signal RD through a buffer 107, and reference numeral 106 denotes a functional block other than the CPU.

On the other hand, in the composite LSI of FIG. 9, signal lines of the data bus 102 of the CPU 101 are connected through resistors r to the input/output terminals 104.

In the LSI of FIG. 8, external noise directly enters the CPU 101, which causes a problem that the LSI can not maintain sufficient electrical reliability. A problem of the LSI of FIG. 9, on the other hand, is concerned with an inevitable delay of signals traveling on the data bus 102. More specifically, it is difficult to set the resistance of the resistors r to a value suitable to every case. Further, since signals are attenuated by the resistors r, the data bus driving capability is reduced.

Therefore, the object of the present invention is to provide a semiconductor integrated circuit capable of preventing such entry of external noise without posing problems of signal propagation delay and bus driving capability decrease.

The above object of the present invention can be achieved by a data bus control circuit for a semiconductor integrated circuit having input/output terminals for data exchange with the outside and constructed by forming a plurality of functional blocks including a CPU on a single semiconductor chip, said data bus control circuit comprising a bi-directional bus buffer for connecting a data bus which is connected to said CPU with said input/output terminals, and means for determining a signal propagation direction of said bus buffer according to a level of a read signal outputted from said CPU.

In a semiconductor integrated circuit using the data bus control circuit according to the present invention, the data bus of the CPU is connected to external devices through the bi-directional bus buffer. This arrangement makes it difficult for external noise to enter the data bus, so that the electrical reliability of the semiconductor integrated circuit is substantially improved. Further, in this semiconductor integrated circuit, there is not the problem of delay in signal propagation which will occur when resistors are used as the bus buffer nor the problem of decrease in the bus driving capability.

Furthermore, the data bus control circuit according to the present invention has a simple construction and can be used for any kind of composite semiconductor integrated circuit. Therefore, time and labor required to study how to best treat the data bus for different systems are not necessary which improves development efficiency.

Further objects and advantages of the present invention will be apparent from the following description with reference being had to the accompanying drawings wherein preferred embodiments of the present invention are clearly shown.

PREFERRED EMBODIMENTS OF THE INVENTION

Figure 1:
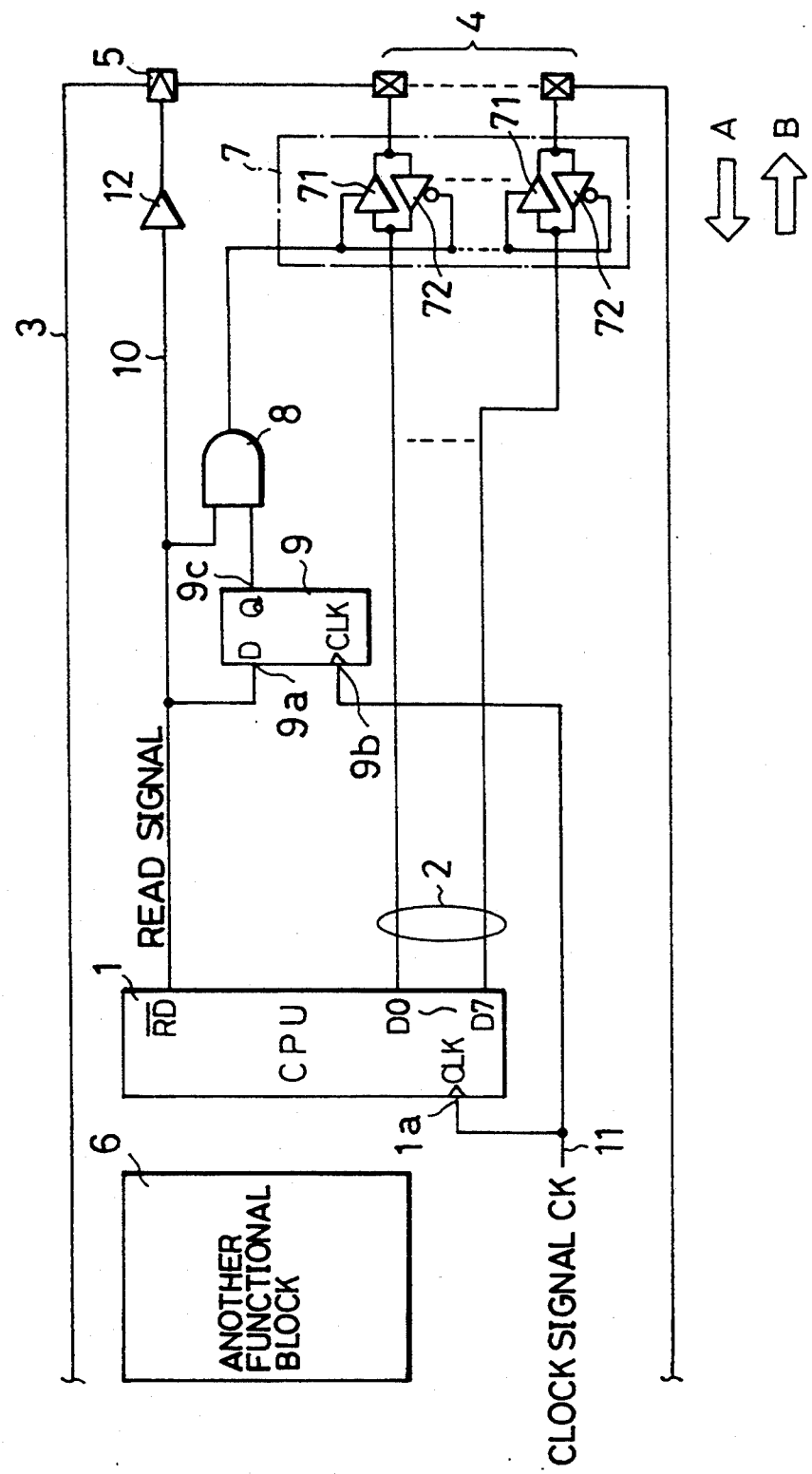
FIG. 1 is a circuit diagram showing the arrangement of LSI in a first embodiment of the present invention.

Preferred embodiments of the present invention will now be described with reference to the accompanying drawings. FIG. 1 is a circuit diagram showing the first embodiment of a semiconductor integrated circuit having a data bus control circuit according to the present invention. This semiconductor integrated circuit, or composite LSI 3, includes a CPU 1 and another functional block 6. The data bus control circuit includes a bi-directional buffer 7, a two-input AND circuit 8, and a flip-flop circuit 9.

The bus buffer 7 comprises eight buffer circuits 71 and eight buffer circuits 72. The inputs of the buffer circuits 71 are connected to signal lines D0 to D7 of the data bus 2 of the CPU 1, while the outputs of the buffer circuits 71 are connected to eight input/output terminals 4 of the composite LSI 3. The inputs of the buffer circuits 72 are connected to the input/output terminals 4, and the outputs of the buffer circuits 72 are connected to the signal lines D0 to D7 of the data bus 2. The control terminals of the buffer circuits 71 and 72 are all connected to the output of the AND circuit 8. The buffer circuit 71 outputs a signal to a corresponding input/output terminal 4 when a high level control signal is supplied thereto, but it does not output any signal when a low-level control signal is supplied thereto. On the other hand, the buffer circuit 72 outputs a signal to the data bus 2 when a low level control signal is supplied thereto, but it does not output any signal when a high level control signal is supplied thereto. In FIG. 1, the arrow A indicates the direction of signal propagation in the bus buffer 7 when the CPU 1 receives an external signal, while the arrow B indicates the direction of signal propagation when the CPU 1 outputs an external signal.

One input of the AND circuit 8 is connected to a read signal line 10 from the CPU 1, while the other input of the AND circuit 8 is connected to a non-inverting output terminal 9c of the flip-flop circuit 9. The data input terminal 9a of the flip-flop circuit 9 is connected to the read signal line 10, and a clock input terminal 9b is connected to a clock input line 11.

The read signal line 10 from the CPU 1 is also connected to a read signal output terminal 5 through a buffer 12. At the time of reading data from an external device such as an input/output device or a storage device connected to the terminals 4 and 5, the CPU 1 outputs an active-low read signal RD on the signal line 10. The clock input terminal 1a is connected to the clock input line 11.

Figure 2:
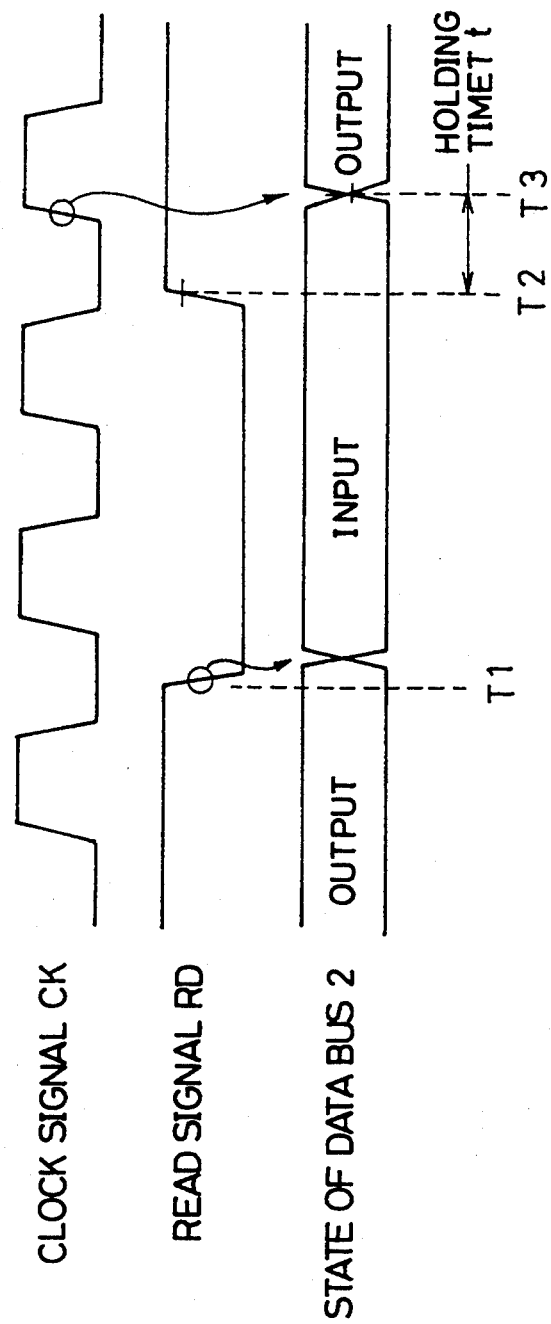
FIG. 2 is a timing chart for explaining the operation of the LSI of FIG. 1.

Referring to the timing chart of FIG. 2, the operation of the LSI in FIG. 1 will be described. When the CPU 1 outputs a low level read signal RD on the signal line 10 in order to read data from an external device, the low level read signal is input at one input of the AND circuit 8 at time T1. As a consequence, the AND circuit 8 immediately outputs a low level output signal to the control terminals of the buffer circuits 71 and 72. The buffer circuits 72 then deliver an "input signal", which the external device supplies to the input/output terminals 4 over the data bus 2. The CPU 1 reads this signal on the data bus 2.

On the other hand, when the CPU 1 sets the read signal RD to a high level at timing T2 in order to output data to the external device, the flip-flop circuit 9 receives this high level read signal RD in synchronism with the rising edge of the clock signal CK from the clock input line 11, and supplies a high level signal to one input of the AND circuit 8. Since at this time the high level read signal RD is being applied to the other input of the AND circuit 8, the AND circuit 8 outputs a high level signal to the control terminals of the buffer circuits 71 and 72. Consequently, the buffer circuits 71 output an "output signal" from the data bus 2 to the external device through the input/output terminals 4.

As has been described, in the composite LSI 3 including the data bus control circuit according to the above embodiment, the data bus 2 of the CPU 1 is connected to the input/output terminals 4 through the buffer 7, and the CPU 1 inputs and outputs signals through the buffer 7. This arrangement offers less chance for external noise to enter the data bus 2, thus substantially improving the electrical reliability of the composite LSI 3. Further, this arrangement eliminates the problem of signal propagation delay as in a case where resisters are adopted as bus buffer means, and also precludes the problem of decreasing bus driving capability.

In this data bus control circuit, when the read signal RD goes to a high level, the switching of the signal propagation direction by the buffer circuit 7 is not executed immediately, but instead at the rising edge of the next clock signal CK. To be more specific, when a holding time t elapses after the read signal RD goes high, the buffer circuits 71 output a signal. Therefore, although there is some delay after the external device receives a high level read input signal RD until the transmission of the signal is stopped completely, this prevents a collision between the signal output by the CPU 1 and the signal output by the external device.

Figure 3:
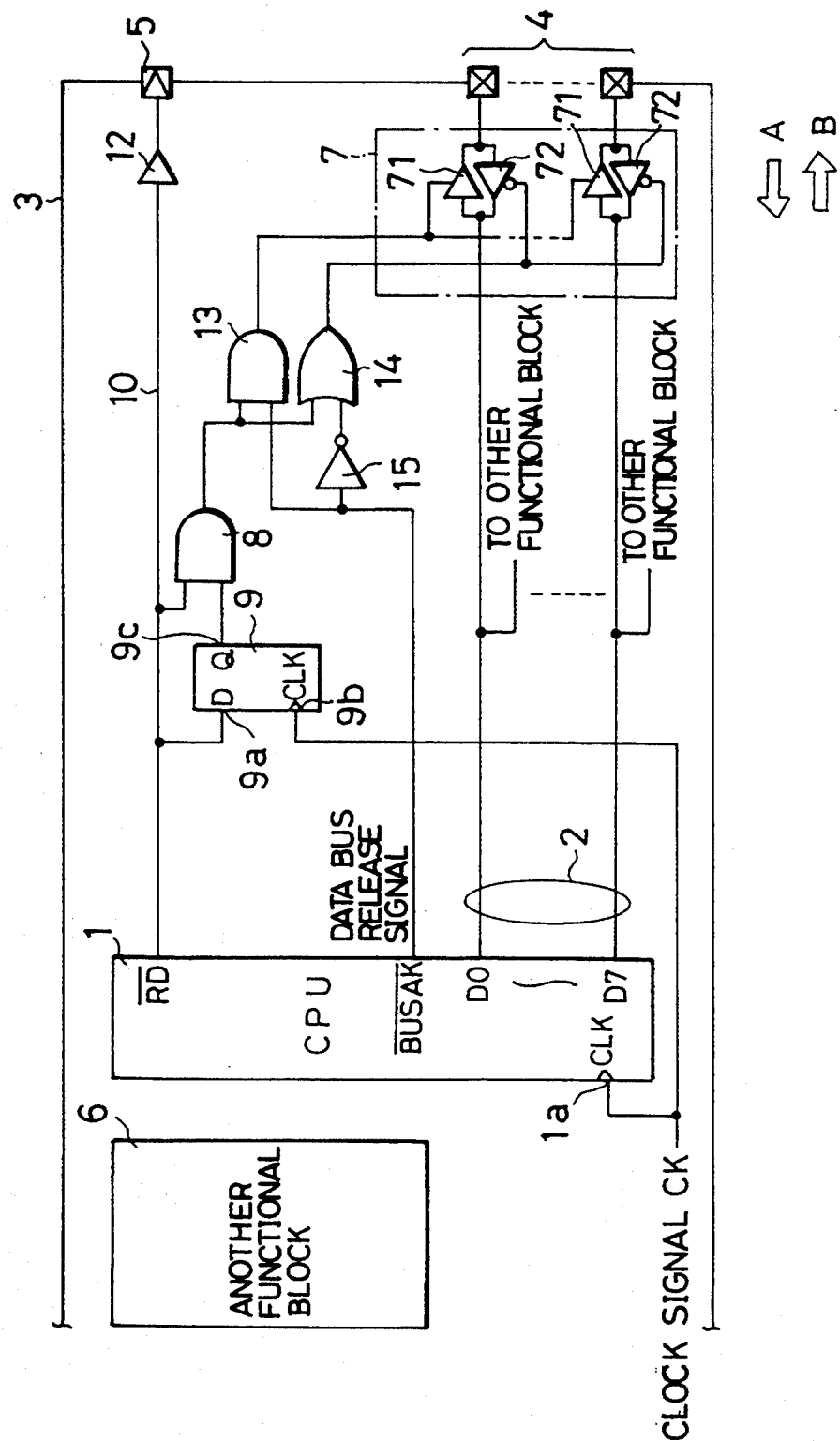
FIG. 3 is a circuit diagram showing the arrangement of a modified embodiment of the LSI of FIG. 1.

FIG. 3 shows a modified example of the first embodiment. In this example, a Z80 microprocessor may be as the CPU 1, and the output of the AND circuit 8 is connected to each input of an AND circuit 13 and an OR circuit 14, the output of the AND circuit 13 is connected to the control terminals of the buffer circuits 71, and the output of the OR circuit 14 is connected to the control terminals of the buffer circuits 72. Further, a data bus release signal BUSAK outputted from the CPU 1 is supplied to the other input of the AND circuit 13 and also to the other input of the OR circuit 14 through an inverter 15.

Figure 4:
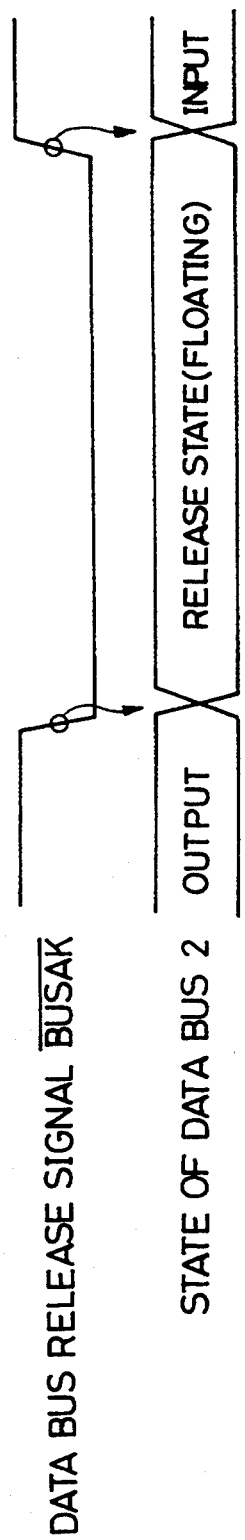
FIG. 4 is a timing chart for explaining the operation of the LSI of FIG. 3.

The operation of this data bus control circuit is the same as that of the first embodiment described above as long as the data bus release signal BUSAK is at high level. When the data bus release signal BUSAK is at low level, as shown in the timing chart of FIG. 4, the data bus 2 is put in a release (floating) state, the signal supplied to the control terminals of the buffer circuits 71 goes to a low level, and the signal supplied to the control terminals of the buffer circuits 72 goes to a high level. Under this state, the LSI 3 and the external device are electrically isolated each other, thus inhibiting exchange of data between the LSI 3 and the external device. Therefore, in this state, data exchange can be carried out between an external storage device and an input/output device in disregard of the LSI 3.

Figure 5:
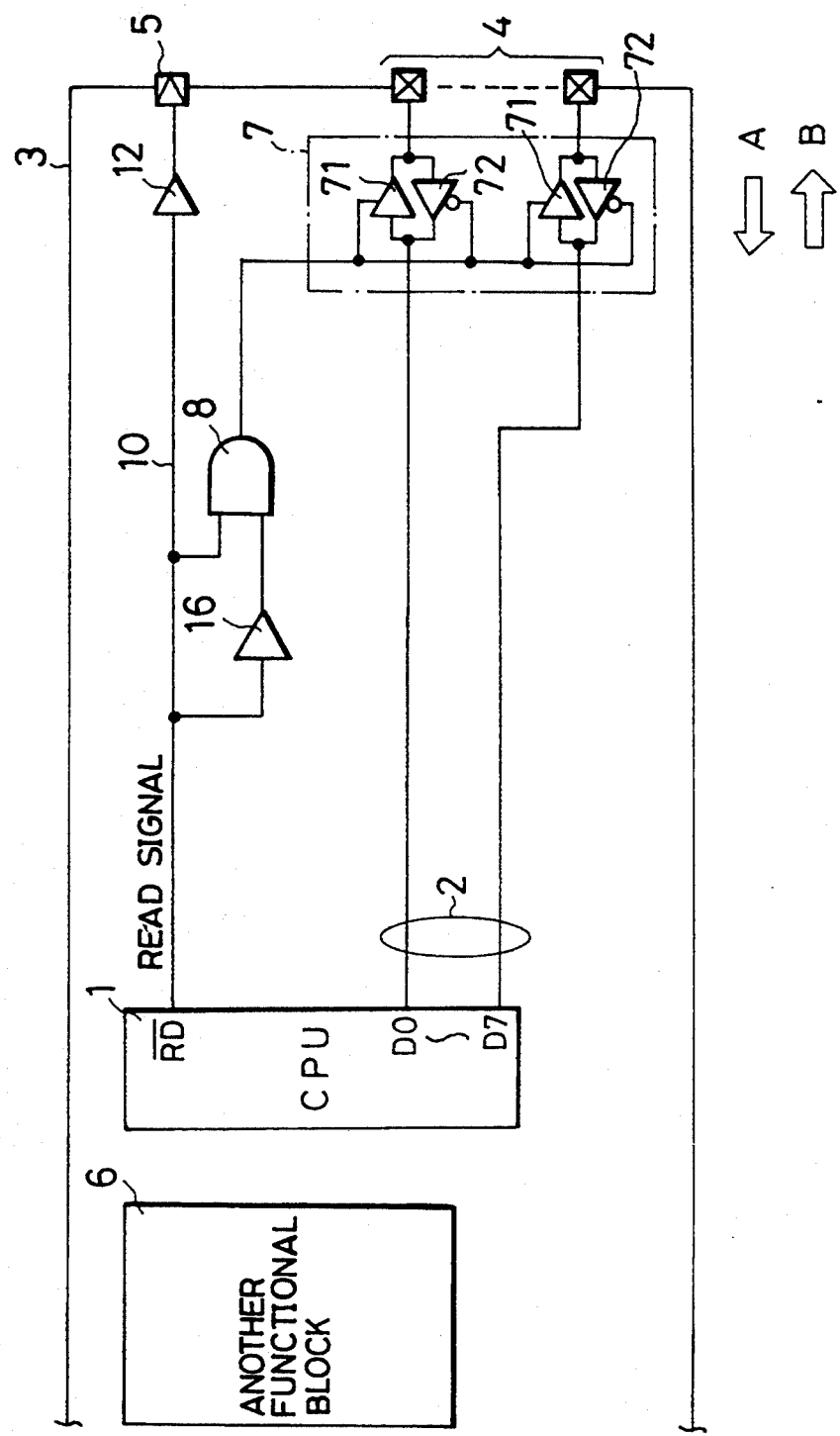
FIG. 5 is a circuit diagram showing the arrangement of a second embodiment of the present invention.
Figure 6:
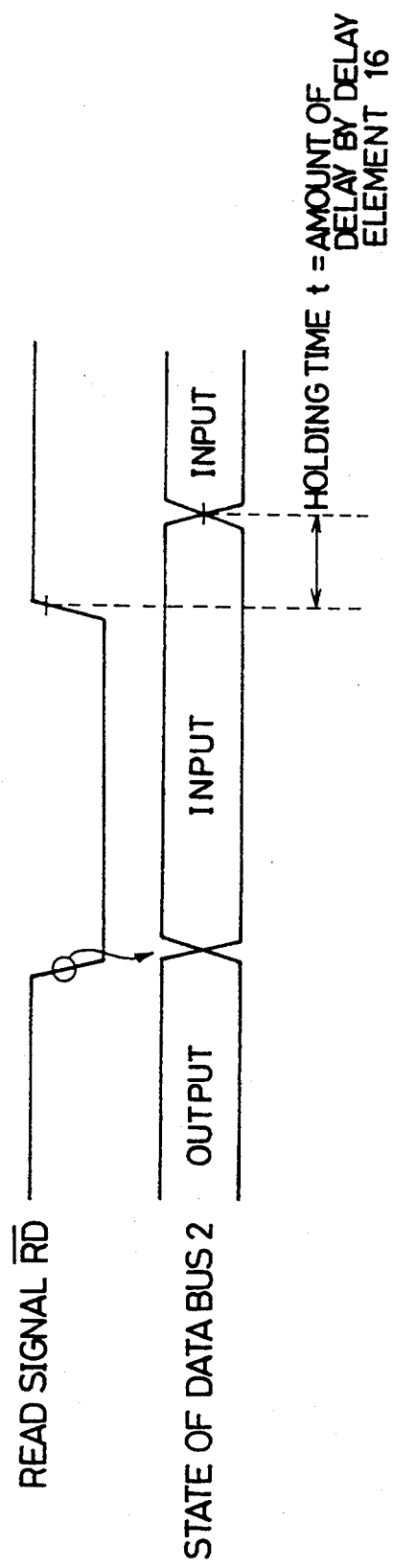
FIG. 6 is a timing chart for explaining the operation of the LSI of FIG. 5.

The second embodiment of the present invention will now be described with reference to FIGS. 5 and 6. In FIG. 5, the elements having the same functions as those of FIG. 1 are designated by the same reference numerals.

The second embodiment differs from the first embodiment in that a delay element 16 is used in place of the flip-flop circuit 9. As indicated in FIG. 5, the input of the delay element 16 is connected to the read signal line 10, and the output of the delay element 16 is connected to one input of the AND circuit 8. As presented in the timing chart of FIG. 6, the moment the read signal RD is changed from the high level to the low level, the output of the AND circuit 8 goes from the high level to the low level, in which condition the CPU 1 can read data from the outside through the input/output terminals 4. When the read signal RD goes from the low level to the high level after an elapse of the holding time t according to the delay characteristics of the delay element 16, the output of the AND circuit 8 goes to the high level, in which condition the CPU 1 can output data to the outside. The holding time t is provided to inhibit collisions when both the LSI 3 and the external device are ready to output data as mentioned above.

In the data bus control circuit in the second embodiment described above, the holding time t is determined not by the clock signal CK but by the amount of delay by the delay element 16, so that the holding time t can be set arbitrarily to suit the characteristics of the external storage device and the input/output device.

Figure 7:
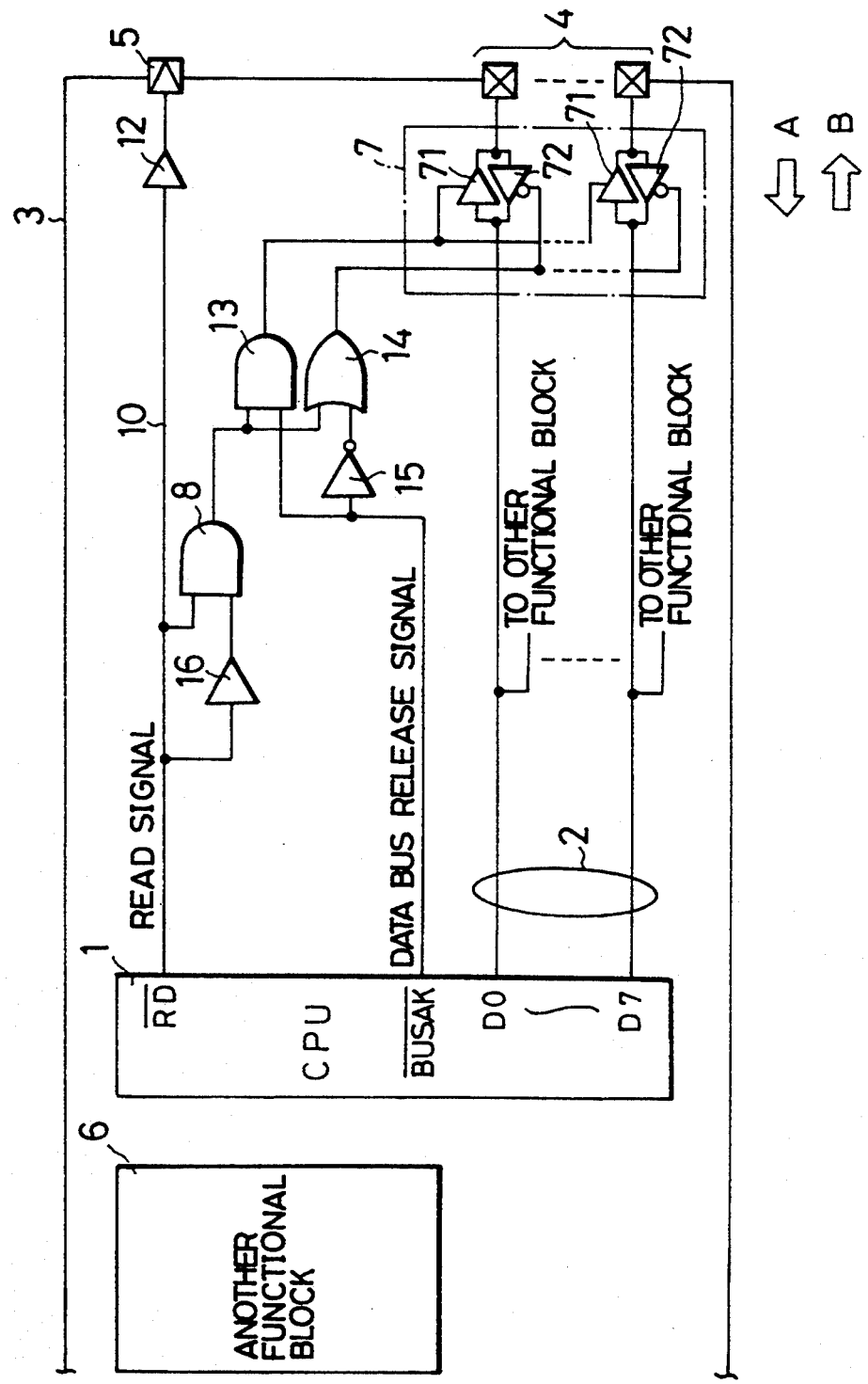
FIG. 7 is a circuit diagram showing the arrangement of a modified embodiment of the LSI of FIG. 5.
Figure 8:
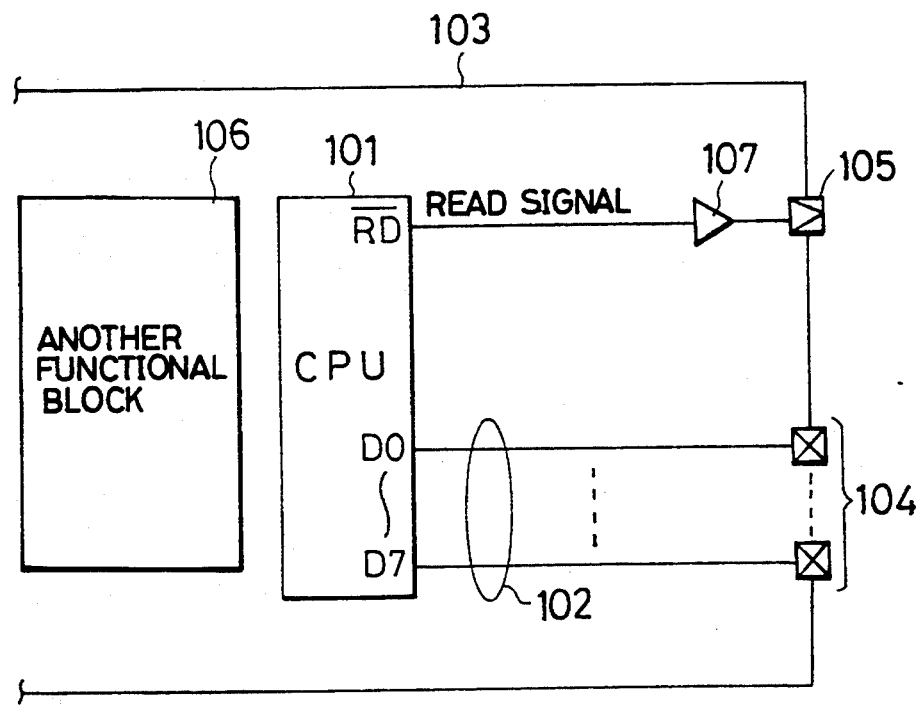
FIG. 8 is a circuit diagram showing the arrangement of a conventional LSI.
Figure 9:
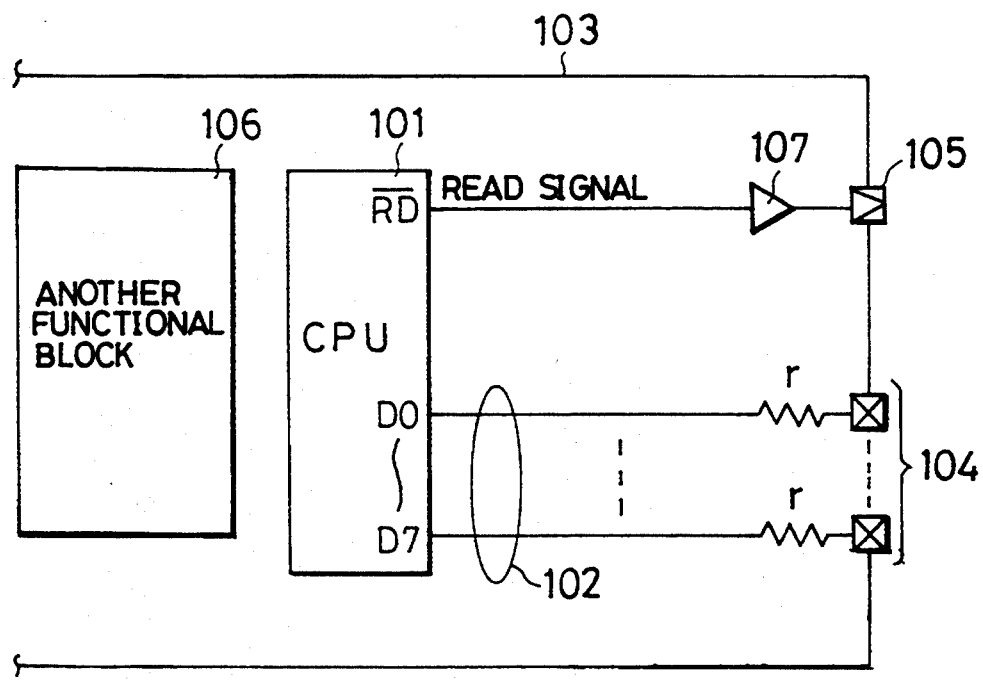
FIG. 9 is a circuit diagram showing the arrangement of another conventional LSI.

FIG. 7 is a circuit diagram showing a modified example of the second embodiment mentioned above. In this modification, as in the modification of the first embodiment, a Z80 microprocessor may be used as the CPU 1. The output of the AND circuit 8 is connected to each input of the AND circuit 13 and the OR circuit 14. The output of the AND circuit 13 is connected to the control terminals of the buffer circuits 71, and the output of the OR circuit 14 is connected to the control terminals of the buffer circuits 72. Further, the data bus release signal BUSAK outputted from the CPU 1 is supplied to the other input of the AND circuit 13 and to the other input of the OR circuit 14 through the inverter 15.

By this arrangement, as described above, when the data bus release signal BUSAK is at the low level, the LSI 3 and the external device are electrically isolated each other, thus inhibiting exchange of data between the LSI 3 and the external device. Therefore, under this condition, data can be exchanged between the external storage device and the input/output device in disregard of the LSI 3.

Many widely different embodiments of the present invention may be constructed without departing from the spirit and scope of the present invention. It should be understood that the present invention is not limited to the specific embodiments described in this specification, except as defined in the appended claims.

What is claimed is:

1. A data bus control circuit for a semiconductor integrated circuit, said semiconductor integrated circuit having input/output terminals for data exchange with a plurality of functional blocks including a CPU on a single semiconductor chip, said data bus control circuit, comprising:

a bi-directional bus buffer for connecting a data bus which is connected to said CPU with said input/output terminals, said bi-directional bus buffer including first and second buffer circuits provided for each of respective signal lines of said data bus, said first and second buffer circuits being connected between a corresponding signal line of said data bus and a corresponding input/output terminal, an input terminal of said first buffer circuit being connected to said corresponding input/output terminal and an output terminal of said first buffer circuit being connected to said corresponding signal line, an input terminal of said second buffer circuit being connected to said corresponding signal line and output terminal of said second buffer circuit being connected to said corresponding input/output terminal, said first buffer circuit becoming conductive when a high level signal is applied to a control terminal thereof and said second buffer circuit becoming conductive when a low level signal is applied to a control terminal thereof, and an electronic circuit for determining a signal propagation direction of said bus buffer according to a level of a read signal outputted frown said CPU and executing the switching of a signal propagation direction of said bi-directional bus buffer with a predetermined time delay after said read signal is output from said CPU in order to prevent a collision between a signal output by said CPU and a signal output by said external device on said data bus, said electronic circuit including:

a flip-flop circuit supplied with said read signal at a data input terminal thereof and a clock signal at a clock input terminal thereof, and an AND circuit supplied with said read signal at one terminal thereof, another input terminal of said AND circuit being connected to a data output terminal of said flip-flop circuit, and an output terminal of said AND circuit being connected to said control terminals of said first and second buffer circuits.

2. A data bus control circuit for a semiconductor integrated circuit, said semiconductor integrated circuit having input/output terminals for data exchange with a plurality of functional blocks including a CPU on a single semiconductor chip, said data bus control circuit, comprising:

a bi-directional bus buffer for connecting a data bus connected to said CPU with said input/output terminals, said bi-directional bus buffer including first and second buffer circuits provided for each of respective signal lines of said data bus, said first and second buffer circuits being connected between a corresponding signal line of said data bus and a corresponding input/output terminal, an input terminal of said first buffer circuit being connected to said corresponding input/output terminal and an output terminal of said first buffer circuit being connected to said corresponding signal line, an input terminal of said second buffer circuit being connected to said corresponding signal line and output terminal of said second buffer circuit being connected to said corresponding input/output terminal, said first buffer circuit becoming conductive when a high level signal is applied to a control terminal thereof and said second buffer circuit becoming conductive when a low level signal is applied to a control terminal thereof, and an electronic circuit for determining a signal propagation direction of said bus buffer according to a level of a read signal outputted from said CPU and executing the switching of a signal propagation direction of said bi-directional bus buffer with a predetermined time delay after said read signal is output from said CPU in order to prevent a collision between a signal output by said CPU and a signal output by said external device on said data bus, said electronic circuit including:

a delay circuit supplied with said read signal at an input terminal thereof, and an AND circuit supplied with said read signal at one input terminal thereof, the other input terminal of said AND circuit being connected to an output terminal of said delay circuit, an output terminal of said AND circuit being connected to said control terminals of said first and second buffer circuits.

3. A data bus control circuit for a semiconductor integrated circuit, said semiconductor integrated circuit having input/output terminals for data exchange with a plurality of functional blocks including a CPU on a single semiconductor chip, said data bus control circuit, comprising:

a bi-directional bus buffer for connecting a data bus which is connected to said CPU with said input/output terminals, said bi-directional bus buffer including first and second buffer circuits provided for each of respective signal lines of said data bus, said first and second buffer circuits being connected between a corresponding signal line of said data bus and a corresponding input/output terminal, an input terminal of said first buffer circuit being connected to said corresponding input/output terminal and an output terminal of said first buffer circuit being connected to said corresponding signal line, an input terminal of said second buffer circuit being connected to said corresponding signal line and output terminal of said second buffer circuit being connected to said corresponding input/output terminal, said first buffer circuit becoming conductive when a high level signal is applied to a control terminal thereof and said second buffer circuit becoming conductive when a low level signal is applied to a control terminal thereof, and an electronic circuit for determining a signal propagation direction of said bus buffer according to a level of a read signal outputted from said CPU and executing switching of a signal propagation direction of said bi-directional bus buffer with a predetermined time delay after said read signal is output from said CPU in order to prevent a collision between a signal output by said CPU and a signal output by said external device on said data bus, said electronic circuit including:

a flip-flop circuit supplied with said read signal at a data input terminal thereof and supplied with a clock signal at a clock input terminal thereof, a first AND circuit supplied with said read signal at one terminal thereof, another input terminal of said first AND circuit being connected to a data output terminal of said flip-flop circuit, a second AND circuit supplied with a output signal of said first AND circuit at one terminal thereof, the other input terminal of said second AND circuit being connected to a data bus release signal terminal of said CPU, an output terminal of said second AND circuit being connected to said control terminal of said first buffer circuit, an inverter supplied with a data bus release signal at an input terminal, and an OR circuit supplied with said output signal of said first AND circuit at one terminal thereof, another terminal of said OR circuit being connected to an output terminal of said inverter, an output terminal of said OR circuit being connected to said control terminal of said second buffer circuit.

* * * * *

UNITED STATES PATENT AND TRADEMARK OFFICE
CERTIFICATE OF CORRECTION

PATENT NO. : 5,418,933
DATED : May 23, 1995
INVENTOR(S) : KIMURA et al.

It is certified that error appears in the above-identified patent and that said letters patent is hereby corrected as shown below:

Title page,

Under Section [30] Foreign Applications Priority Data, change "Feb. 20, 1990" to --Feb. 20, 1991--.

Signed and Sealed this

First Day of August, 1995

*Attest:*

BRUCE LEHMAN

*Attesting Officer*    *Commissioner of Patents and Trademarks*